(12) United States Patent
Nöllgen et al.

(10) Patent No.: US 11,792,555 B2
(45) Date of Patent: Oct. 17, 2023

(54) METHOD FOR CONTROLLING A WEARABLE USER DEVICE, A WEARABLE USER DEVICE AS WELL AS A CONTROL SYSTEM

(71) Applicant: Workaround GmbH, Munich (DE)

(72) Inventors: Till Nöllgen, Munich (DE); Johannes Hutter, Munich (DE); Daniel Wolfertshofer, Munich (DE)

(73) Assignee: WORKAROUND GMBH, Munich (DE)

( * ) Notice: Subject to any disclaimer, the term of this patent is extended or adjusted under 35 U.S.C. 154(b) by 0 days.

(21) Appl. No.: 17/526,814

(22) Filed: Nov. 15, 2021

(65) Prior Publication Data
US 2022/0159355 A1 May 19, 2022

(30) Foreign Application Priority Data
Nov. 16, 2020 (DE) ...................... 10 2020 130 231.2

(51) Int. Cl.
*H04Q 9/00* (2006.01)
*H04B 1/3827* (2015.01)
(Continued)

(52) U.S. Cl.
CPC ............... *H04Q 9/00* (2013.01); *H04B 1/385* (2013.01); *H04W 76/10* (2018.02);
(Continued)

(58) Field of Classification Search
CPC ........... H04Q 2209/00; H04Q 2209/10; H04Q 2209/20; H04Q 2209/40; H04Q 2209/43;
(Continued)

(56) References Cited

U.S. PATENT DOCUMENTS 10,514,713 B2 * 12/2019 Lv ...................... G05D 23/1934
10,537,143 B2 * 1/2020 Guenther ............... G09B 19/00
(Continued)

FOREIGN PATENT DOCUMENTS

DE 102014103426 A1 9/2014

OTHER PUBLICATIONS

Kong et al., "Industrial wearable system: the human-centric empowering technology in Industry 4.0", Journal of Intelligent Manufacturing (2019) 30:2853-2869.

*Primary Examiner* — Franklin D Balseca
(74) *Attorney, Agent, or Firm* — Dilworth IP, LLC (57) ABSTRACT

Method for controlling a wearable user device, which is a sensor and/or information device including establishment of a wireless communication link between the user device and a gateway, transmission of a connection event message to the process control system, wherein the connection event message contains an identifier of the user device, an identifier of the gateway and information on the successful establishment of the communication link, transmission of sensor data from the user device to the process control system, generation of at least one control instruction by the process control system in response to the received sensor data, wherein the control instruction is generated depending on the identifier of the gateway and depending on the received sensor data, and transmission of the at least one control instruction to the user device. Furthermore, a wearable user device as well as a control system are disclosed.

12 Claims, 4 Drawing Sheets

(51) Int. Cl.
*H04W 76/10* (2018.01)
*H04W 88/16* (2009.01)

(52) U.S. Cl.
CPC . *H04B 2001/3861* (2013.01); *H04Q 2209/40* (2013.01); *H04W 88/16* (2013.01)

(58) Field of Classification Search
CPC ........... H04Q 2209/70; H04Q 2209/80; H04Q 2209/82; H04Q 9/00; H04W 76/10; H04W 88/16; H04B 1/385; H04B 2001/3861
See application file for complete search history.

(56) References Cited

U.S. PATENT DOCUMENTS

| | | | | |
|---|---|---|---|---|
| 2012/0059924 A1* | 3/2012 | Zhang | .................... | H04W 4/50 |
| | | | | 709/223 |
| 2021/0263508 A1* | 8/2021 | Wang | ............... | G05B 19/41875 |
| 2021/0302945 A1* | 9/2021 | Suzuki | .................. | G06Q 50/04 |

\* cited by examiner

METHOD FOR CONTROLLING A WEARABLE USER DEVICE, A WEARABLE USER DEVICE AS WELL AS A CONTROL SYSTEM

FIELD OF THE INVENTION

The invention relates to a method for controlling a wearable user device, a wearable user device as well as a control system comprising a wearable user device.

BACKGROUND

In modern production processes, control systems are used to instruct a worker who is carrying out individual process steps of a complex sequence of process steps. For this purpose, sensor devices, for example barcode scanners, are usually used, by means of which barcodes on components to be assembled are scanned and checked, documented and confirmed by a central process control system, for example an inventory management system.

To be able to function correctly, the sensor devices must be registered with a specific task in the inventory management system so that the inventory management system can interpret the information originating from the sensor devices correctly.

As a result, it is not possible for a worker to change the task together with the worker's sensor device and to spontaneously support another part in the process sequence, for example as a result of a shortage of resources. To this end, either a change of hardware, i.e., the sensor device, or a complex configuration and registration of the sensor device carried by the worker would be necessary.

It is therefore the object of the invention to enable a change of a worker's task and the corresponding user device in a simple manner.

SUMMARY

The object is solved by means of a method for controlling a wearable user device that is a sensor and/or information device. The method comprises the following steps:
a) establishment of a wireless communication link between the user device and a gateway, wherein the gateway is connected to a central process control system,
b) transmission of a connection event message to the process control system, wherein the connection event message contains an identifier of the user device, an identifier of the gateway and information on the successful establishment of the communication link between the user device and the gateway,
c) generation of sensor data by means of a sensor of the user device,
d) transmission of the sensor data from the user device to the process control system,
e) generation of said at least one control instruction by the process control system in response to the received sensor data, wherein the control instruction is generated depending on the identifier of the gateway and depending on the received sensor data, and
f) transmission of said at least one control instruction from the process control system to the user device.

Due to the fact that the connection event message contains the identifier of the user device and the identifier of the gateway after the successful establishment of a wireless communication link, the process control system contains information that the user device is now being used for another purpose. The process control system can identify this purpose by means of the identifier of the gateway without requiring further configuration steps or a change in the hardware.

The user device is in particular a device whose function is limited to specific applications. To this end, it can comprise an embedded system and/or a compact form. For example, the user device is not a multi-functional device, thus is not a smart device, such as a smartphone, a tablet, a smart watch or smart glasses.

It is however also conceivable that the user device is a smart device, such as a smartphone, a tablet, a smart watch or smart glasses.

For example, the establishment of the communication link is initiated by scanning a barcode that is assigned to the gateway.

The barcode can be a one-dimensional barcode and/or a multi-dimensional barcode, such as a 2D code, a stacked code, a matrix code, a multicolour code, a QR code or suchlike.

The transmission of the sensor data to the process control system occurs in particular in the data format that is determined by a control instruction previously received by user device.

In an embodiment, the connection event message is generated by the user device or by the gateway and transmitted to the process control system. As a result, the user device is independent of the gateways, or vice versa, is capable of displaying a change in location in the process control system.

In a variant, said at least one control instruction contains at least one of the following items of information:
configuration settings for the user device, in particular the data format, in which the sensor data obtained by the user device is to be transmitted to the gateway and/or the process control system; said sensor data having been generated by at least one sensor of the user device,
information that is to be outputted on a screen of the user device, particularly text, and/or
instructions to output an optical, haptic and/or acoustic signal to the user or worker, in particular wherein details are included on the signal to be outputted.

In this way, the user device can be operated in a targeted manner.

The configuration settings are adopted by the user device, for example when the control instruction has been received.

The configuration settings can also contain an instruction to the user device to execute an update of the firmware. The update of the firmware is then executed by the user device on this gateway, if applicable time delayed. In this way, it is possible to stipulate that firmware updates are only executed on specific gateways and/or it can be ensured that the user devices actually execute the firmware updates.

To instruct the user or worker more efficiently, the method can also have one of the following steps:
a) display of the information contained in the control instruction, particularly text, on the screen of the user device by means of the user device; and/or
b) output of the optical, haptic and/or acoustic signal defined in the control instruction by means of the user device.

In an embodiment, a sequence of process steps is stored in the process control system, the process control system compares the sensor data received with the sequence, in particular with the sensor data expected according to the sequence, and the process control system generates said at least one control instruction depending on the result of the comparison too, thus enabling the process control system to check adherence to the sequence and to instruct the user or worker accordingly.

For example, the gateway and/or the location of the gateway is linked in the process control system to at least one part of the sequence, in particular to at least one process step. In this way, the user device can also be integrated reliably into the sequence after a change in location.

To be able to determine the location particularly precisely, the gateway can also be stationary.

The location of the gateway can be stored in the central process control system, for example by inputting the location of the gateway in a corresponding mask of a computer or smart device with a communication link to the process control system.

Alternatively, or additionally, the location of the gateway can be stored in the process control system so that a barcode is scanned whose location is already known to the process control system. This can occur during the installation process of the gateway.

In the process control system, it is also possible to store that a gateway is located close to an object with a stationary barcode, for example a shelf or an assembly station. In this case, the location of the object is assumed to be the location of the gateway.

It is also conceivable that the location of the gateway is determined independently of the process control system, for example using recurring sequences. For example, the process control system can infer that the gateway is located near to a stationary object with a barcode if the user device is always connected to the same gateway when reading this barcode. In this case as well, the location of the object is also assumed to be the location of the gateway.

In addition to the user device, further devices, in particular further user devices, can be connected to the gateway and the control instruction can also be generated using the identifier of the user device, in particular wherein the control instruction and/or an addition record to the sensor data contain the identifier of the user device. By means of the identifier of the user device, the process control system can differentiate between different devices so that is possible to work with several user devices on different process steps.

Moreover, the object is solved by a wearable user device for a control system, comprising a sensor and/or a screen and a communication module for wireless communication with a gateway, wherein the user device is configured to transmit a connection event message to a process control system of the control system after establishing a communication link to the gateway, wherein the connection event message contains an identifier of the user device, an identifier of the gateway and information on the successful establishment of the communication link between the user device and the gateway.

The steps, features and advantages discussed for the method equally apply to the wearable user device and vice versa.

The object is also solved by a control system comprising a wearable user device, in particular as previously described, a gateway and a central process control system, wherein the control system is configured to execute a method previously described.

The steps, features and advantages discussed for the method and/or the wearable user device equally apply to the control system and vice versa.

It is also of course self-evident that the individual components of the control system and the wearable user device are each configured to also execute the steps executed by them in the method.

In an embodiment, the control system comprises a garment, in particular a glove, comprising a holder into which the user device is inserted when used properly. In this way, the user device can be worn by the user or worker particularly easily.

BRIEF DESCRIPTION OF THE DRAWINGS

Additional advantages and features can be found in the following description as well as in the attached drawings to which reference is made. In the drawings.

Figure 1:
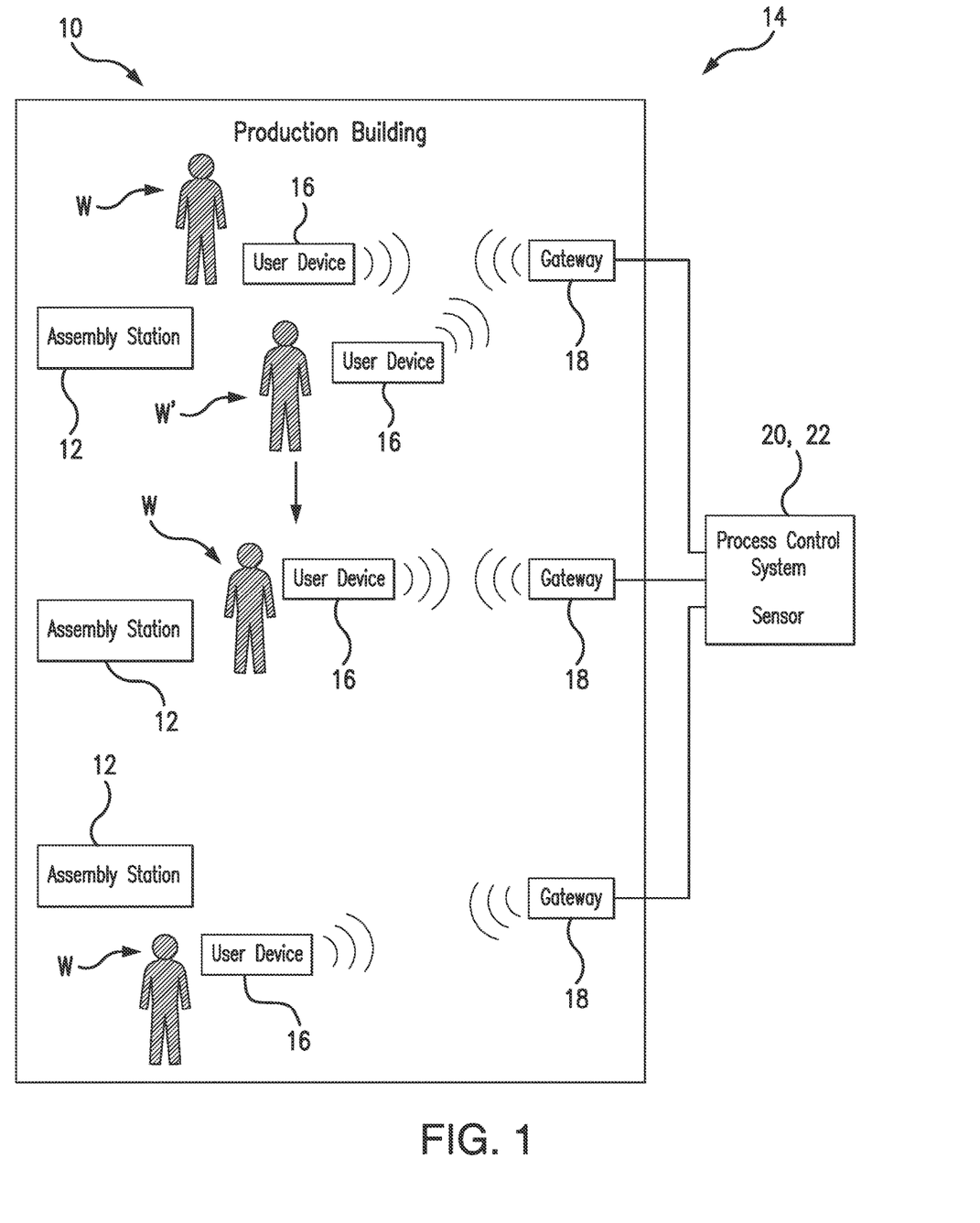
FIG. 1 schematically shows a production building with a control system according to the invention as well as several user devices according to the invention.

FIG. 1 shows a production building 10 comprising several assembly stations 12 as well as a control system 14 according to the invention in an aerial perspective extremely schematically.

DETAILED DESCRIPTION

A product is manufactured in the production building 10 and the production of said product must adhere to a predefined sequence comprising different process steps. The different process steps are executed by workers W at the different assembly stations 12, wherein different process steps are executed in each case at each assembly station 12, in particular also several process steps.

Thus, in production, the product passes through all assembly stations 12.

For example, the product is a vehicle or parts therefor.

The control system 14 has several wearable user devices 16, several gateways 18 as well as a central process control system 20.

The user devices 12 are worn by the workers W. For example, each worker W wears at least one or more user devices 16.

The user devices 16 are connected in each case for communication with one of the gateways 18 via wireless radio technology, for example Bluetooth, in particular Bluetooth Low Energy, DECT or WLAN.

In turn, the gateways 18 are connected, in particular via a wired connection, to the central process control system 20 and are configured to send sensor data D received by the user devices 16 to the process control system 20 and to transmit control instructions S received by the process control system 20 to the user devices 16.

It is however also conceivable that the gateways 18 are connected to the central process control system 20 at least in part wirelessly, for example using the WebSocket protocol. The transmission of the identifier of the gateway is particularly helpful in these situations.

For example, the gateways 18 are located stationarily in the production building 10. A specific area of the production building 10 is thus assigned to each gateway 18 so that a communication link exists between the user devices 16 of the workers W who are working in this area and the corresponding gateway 18.

The location or the area of the gateway 18 can be stored for example in the central process control system 20. When setting up the gateways 18, this can be done by inputting the location or area of the gateway 18 in a corresponding mask of a computer or smart device (smartphone, tablet, etc.).

Alternatively, or additionally, the location or area of the gateway 18 can be stored in the central process control system 20 so that a barcode is scanned whose location is already known to the process control system 20. This can occur during an installation process of the gateway 18.

It is also possible to store in the process control system that a gateway is located close to an assembly station 12 with a stationary barcode. In this case, the location of the assembly station 12 is assumed to be the location of the gateway 18.

It is also conceivable that the location of the gateway 18 is determined independently of the process control system 20, for example using recurring sequences. For example, the process control system 20 can infer that the gateway 18 is located near to a specific assembly station 12 with a barcode if the user device 16 is always connected to the same gateway 18 when reading this barcode. In this case as well, the location of the corresponding assembly station 12 is assumed to be the location of the gateway 18.

In the shown embodiment, a gateway 18 is assigned to each assembly station 12 so that the user devices 16 of the workers W of the corresponding assembly station 12 have established a communication link to the gateway 18 assigned to the assembly station 12.

The central process control system 20 receives sensor data D from the user devices 16 and in response to this transmits control instructions S back to the user devices 16.

The central process control system 20 is, for example, a server with a corresponding application, in which the sequence executed in the production building 10 is stored with all the individual process steps as well as the assignment of the process steps to the assembly stations 12. The server can either be at the production site itself or be a cloud server.

For example, the application on the server is an inventory management system and/or an enterprise resource planning system (ERP system).

Figure 2:
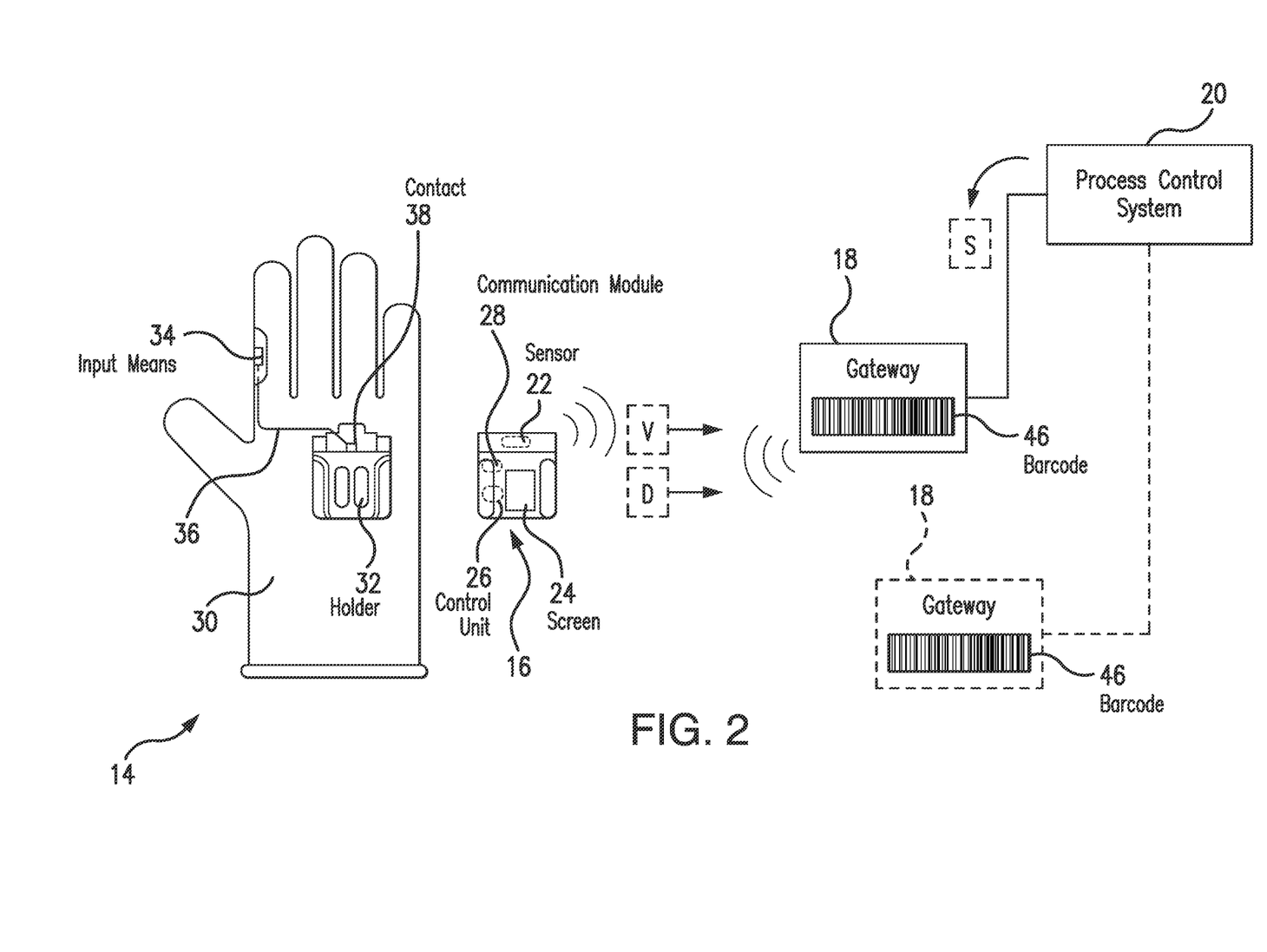
FIG. 2 shows a schematic detailed view of a user device, a gateway and the central process control system of the control system according to FIG. 1.

In FIG. 2, one of the user devices 16 as well as two gateways 18 are shown in detail exemplarily.

In the shown embodiment, the user device 16 is a sensor and information device and comprises a sensor 22, a screen 24, a control unit 26 with a communication module 28 and a power storage medium, such as an accumulator.

The user device 16 is in particular a device whose function is limited to specific applications. To this end, it can comprise an embedded system and/or a compact form.

For example, the user device 16 of FIG. 2 is not a multi-functional device, thus is not a smart device, such as a smartphone, a tablet, a smart watch or smart glasses.

Figure 3:
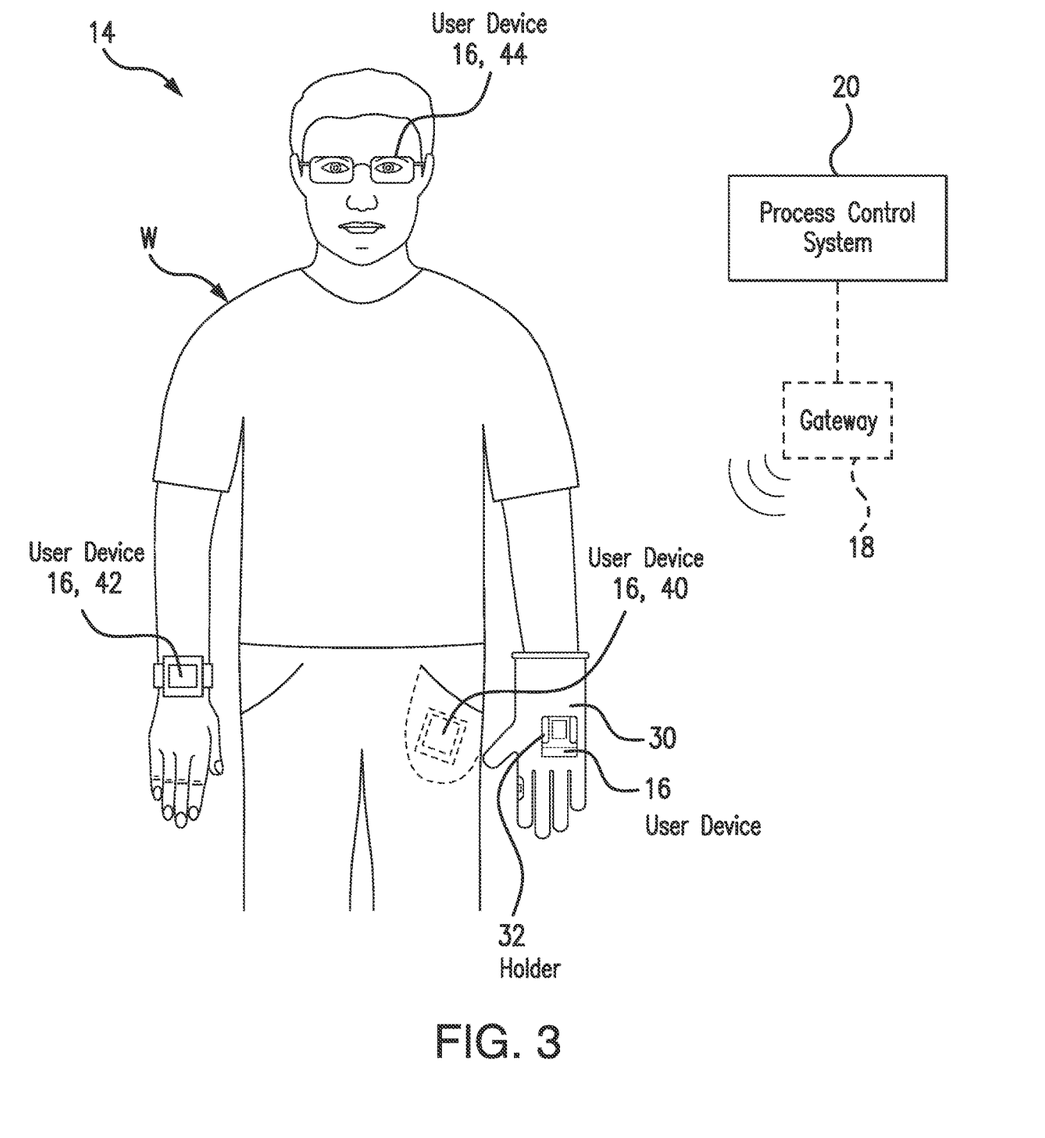
FIG. 3 shows the user device from FIG. 2 in the worn condition.

It is however also conceivable that the user device 16, as shown in FIG. 3, is a smart device, such as a smartphone, a tablet, a smart watch or smart glasses.

However, it should be noted that this embodiment is purely exemplary for illustration purposes. Alternatively, the user device 16 can also be designed as a purely information device that does not have a sensor unit, but rather a screen 24 for displaying information. A purely sensor device without a visual display unit is also conceivable as a user device 16.

In the shown embodiment, the sensor 22 is an optical sensor, for example a camera. It is also conceivable that the sensor 22 has other sensor units, such as an RFID reader, a camera, touch sensors or acceleration sensors, in addition to or instead of the optical sensor.

The communication module 28 of the user device 16 is configured to establish a wireless communication link (Bluetooth, WLAN, DECT) to the gateway 18 and to exchange data.

As can be seen in FIG. 2, the control system 14 has in additional a garment 30, in particular a glove, by means of which the user device 16 can be fastened to the body of the worker W. The user device 16 or the combination of the garment 30 and the user device 16 is what is termed a "wearable".

To this end, the garment 30 has a holder 32 in which the user device 16 can be fastened and removed without tools in a repeatable manner.

The garment 30 can also have an input means 34, for example a trigger for the user device 16. The trigger or the input means 34 can be provided on a finger of the glove. It is also conceivable that said at least one input means 34 or one or more additional input means 34 are provided on the holder 32.

By means of at least one cable 36 and at least one contact 38 in the holder 32, the input means 34 is connected to the user device 16 as soon as the user device 16 is inserted in the holder 32.

Alternatively, or in addition to the input means on the garment 30, the screen 24 can be configured as an input means. For example, the screen 24 is configured as a touch display.

In FIG. 3, the user device 16 is shown being worn on the worker W in proper use.

Furthermore, other, alternative or additional user devices 16 are shown in FIG. 3 which the worker W can wear, for example in the form of a smart device 40, such as a smart phone, a tablet, a smart watch 42 or smart glasses 44.

As can also be seen in FIG. 2, the gateway 18 has a barcode 46 that uniquely identifies the gateway 18. The barcode 46 can be a one-dimensional barcode and/or a multi-dimensional barcode, such as a 2D code, a stacked code, a matrix code, a multicolour code, a QR code or suchlike.

Figure 4:
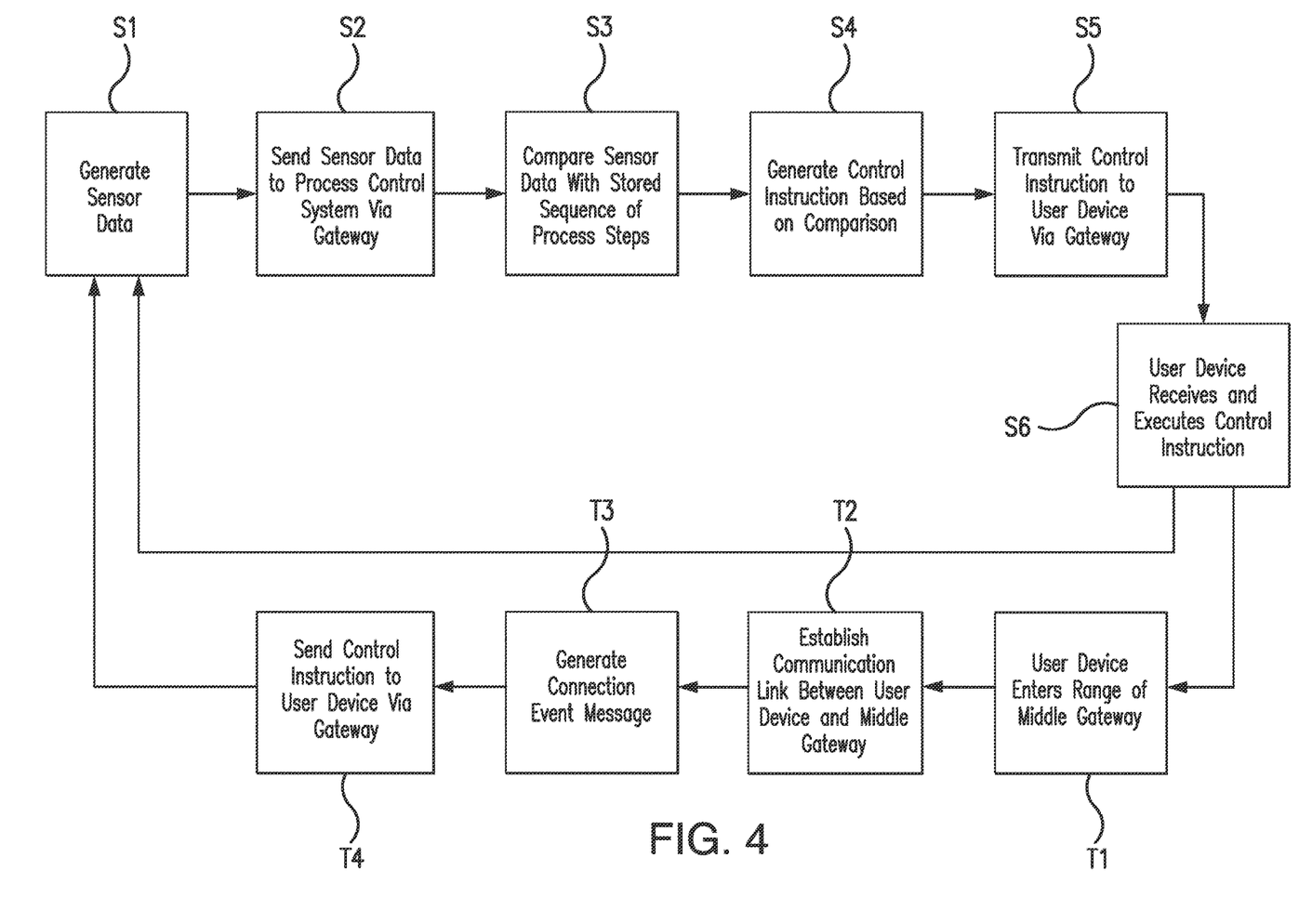
FIG. 4 shows a flow diagram of the method according to the invention.

While the worker W at an assembly station 12 executes the process steps belonging to this assembly station, or parts thereof, the worker W is instructed by the central process control system 20 using the user device 16, as shown in FIG. 4.

For example, before installing a component on the product, the worker W must capture a barcode of the product by means of the sensor 22 of the user device 16, thus generating the sensor data D (step S1). To this end, the worker W triggers, for example, the sensor 22 by actuating the input means 34 on the garment 30.

The user device 16 now sends the sensor data D to the process control system 20 by means of the gateway 18 (step S2).

The central process control system 20 now checks the received sensor data D with the stored sequence of process steps that are executed in the production building 10.

Based on the stored sequences of process steps, specific predefined sensor data D or a predefined specific type of sensor data is expected predefined by the process control system 20 as the next process step, and thus as the next sensor data D. In the shown embodiment, the barcode from the component that is to be assembled on the product next is now expected as sensor data D (step S3).

In step S4, the central process control system 20 now generates a control instruction S based on the results of the comparison in order to inform the worker W as to whether the worker W would like to install the correct component or has scanned the correct barcode and/or to provide the worker W with further information.

To this end, the control instruction S comprises information, in particular text that is to be shown on the screen 24 of the user device 16.

Alternatively, or additionally, the control instruction S commands the user device 16 to output an optical, haptic and/or acoustic signal to the worker W.

For example, the control instruction S contains the text "component correct" and an instruction to light up the green LEDs of the user device 16.

The control instruction S is transmitted by the process control system 20 to the user device 16 by means of the gateway 18 (step S5).

In step S6, the user device 16 receives the control instruction S and executes the instructions contained in the control instruction S.

For example, the text contained in the control instruction is outputted on the screen 24 and/or the optical, haptic and/or acoustic signal contained in the control instruction S is outputted by the user device 16 that comprises of course the corresponding signal generators (not shown).

In the embodiment described, the user device 16 now outputs the text "component correct" on the screen 24 as well as lights up a green LED.

The worker W can now install the component on the product and proceed to the next process step or carry out other instructions if these are shown on the screen 24.

In doing so, the worker W uses the sensor 22 again and generates sensor data D. Thus, the method begins again with step S1.

In addition to the previously described user device 16, further user devices 16 are connected to the gateway 18 and the central process control system 20.

So that the user device 16 can be uniquely identified by the process control system 20 in this case, a unique identifier of the user device 16 is also transmitted for example to the process control system 20 in addition to the sensor data D. This can also occur as part of a message together with the sensor data D, for example as an addition record.

As a result, the process control system 20 can create a control instruction S for the specific user device 16 so that the control instruction S is thus generated using the identifier of the user device 16 as well.

The identifier of the user device 16 can be subsequently a part of the control instruction S.

So that the process control system 20 can execute a comparison with the intended sequence and a corresponding control instruction S in step S3 and step S4, the process control system 20 also has information about which process steps have been carried out by the user device 16, or rather the worker W carrying the user device 16.

In the simplest case, each user device 16 is assigned to a process step or an assembly station 12 so that the different process steps can be assigned directly to the user device 16 or its identifier in the process control system 20.

If a worker W however changes task, for example as a result of moving to another assembly station 12, the process control system 20 must be informed about this change as otherwise it cannot execute the comparison in step S4 reliably.

For example, the worker W' moves from the uppermost assembly station 12 to the middle assembly station 12 in FIG. 1.

The worker W' then enters the range of the middle gateway 18 that is assigned to the middle assembly station 12 (Step T1).

The user device 16 of the worker W' now establishes a communication link to the middle gateway 18 and disconnects its link to the uppermost assembly station 18 (step T2).

This can either occur automatically similar to a transfer of end devices in a mesh network or can be initiated manually by the worker W.

In this case, the worker W' can scan the barcode 46 on the middle gateway 18, in whose range the worker W' will be working in the future. Based on the information stored in the barcode, the user device 16 then establishes a wireless communication link to the middle gateway 18.

The communication link between the user device 16 and the uppermost gateway 18, i.e., to the gateway to which it was previously connected, is disconnected by user device 16 if the user device 16 is still within the range of the gateway 18 to which it was previously connected.

In step T3, a connection event message V is now generated, for example by the user device 16 itself or the gateway 18, after successfully the successful process control system 20, of course via the gateway 18.

The connection event message V contains the identifier of the user device 16, the identifier of the gateway 18 to which the communication link has been successfully established as well as information that a communication link between the user device 16 and the gateway 18 has been established. This information can also already be seen in the fact that the identifier of the user device 16 and the identifier of the gateway 18 are contained in the connection event message.

Of course, the information on the establishment of a communication link can also be a separate part of the connection event message V.

The user device 16 contains the identifier of the gateway 18, for example as part of the information that is exchanged when establishing the wireless communication link and/or is contained in the barcode 46.

The process control system 20 now has information that the user device 16 is connected to another gateway 18. At the same time, this gateway 18 is allocated to a specific assembly station 12 with specific process steps. In this way, the process control system 20 can now link the user device 16 with the other process steps in the sequence for the purpose of executing the comparison in step S3 and generating the control instruction S in step S4.

The worker W' who is now working at the middle assembly station 12 can continue to work without any difficulty and can generate sensor data by means of the sensor 22 (step S1).

The control process by means of the process control system 20 now proceeds as previously described, i.e., the steps S2 to S6, wherein the process control system 20 takes into account in steps S3 and S4 the identifier of the gateway 18 which has been received by the user device 16 in the last connection event message V. In other words, the control instruction S is thus also generated depending on the identifier of the gateway 18 that determines the process to be executed by the worker W.

Alternatively, or additionally, it is possible that the process control system 20 then sends a control instruction S to the user device 16 in a step T4 after receiving the connection event message V—without the sensor data D being transmitted.

For example, configuration information comprising configuration settings for the user device 16 are contained in this control instruction S, e.g., the data format in which the sensor data D obtained from the user device 16 is to be transmitted to the gateway 18 or the process control system 20.

In doing so, the configuration or the data format is of course dependent on the process steps that are now to be executed with the user device 16 or rather by the worker W', wherein said process steps are to be defined uniquely by means of the identifier of the gateway 18.

Therefore, this control instruction S is also generated depending on the identifier of the gateway 18.

The configuration information and configuration settings can also contain an instruction to the user device 16 to execute an update of the firmware of the control unit 26. The update of the firmware is then executed by the user device 16 on this gateway 18, if applicable time delayed. If updates are only to be executed on a specific gateway 18, the control instruction S is generated with the instruction for the firmware update also depending on the identifier of the gateway 18 as well.

A change to the configuration, e.g. the data format, can occur for example if the new task of the worker W' is now in quality control, i.e. that the worker W' does not have to scan barcodes for components to be assembled with the user device 16, but rather takes a photograph for the quality check of the assembled product by means of the sensor 22, here a camera.

In this case, as soon as the user device 16 establishes a communication link to the corresponding gateway 18, the user device 16 receives the control instruction S from the process control system 20 that the sensor data D now is to be transmitted as an image taken by the camera and not as a representation of a barcode.

In this way, even a change in the functionality of the user device 16 is easily possible.

By means of the method, workers W can therefore change between the different assembly stations 12 or tasks in a process sequence flexibly without requiring a change in hardware or a complex configuration or registration.

The invention claimed is:

1. A method for controlling a wearable user device, which is a sensor and/or information device, the method comprising steps of:
    a) establishment of a wireless communication link between the user device and a first gateway, wherein the first gateway is connected to a central process control system, wherein the first gateway is one of a plurality of gateways connected to the central process control system, each of the plurality of gateways being allocated to one or more process steps,
    b) transmission of a connection event message to the central process control system, wherein the connection event message contains an identifier of the user device, an identifier of the first gateway and information on a successful establishment of the communication link between the user device and the first gateway,
    c) generation of sensor data by means of a sensor of the user device,
    d) transmission of the sensor data from the user device to the central process control system,
    e) generation of at least one control instruction by the central process control system in response to the transmitted sensor data, wherein the control instruction is generated depending on the identifier of the first gateway and depending on the transmitted sensor data, wherein in generating the control instruction depending on the identifier of the first gateway, the central process control system associates the user device with at least one process step based on the identifier of the first gateway, and
    f) transmission of said at least one control instruction from the central process control system to the user device.

2. The method according to claim 1, wherein the connection event message is generated by the user device or by the first gateway and is transmitted to the central process control system.

3. The method according to claim 1, wherein said at least one control instruction contains at least one of:
    configuration settings for the user device, including a data format, in which the sensor data obtained by the user device is to be transmitted to the first gateway and/or the central process control system; said sensor data having been generated by at least one sensor of the user device,
    information that is to be outputted on a screen of the user device, including text, and/or
    instructions to output an optical, haptic and/or acoustic signal to the user, wherein details are included on the signal to be outputted.

4. The method according to claim 3, further comprising at least one step of:
    a) display of the information contained in the control instruction, including the text, on the screen of the user device by means of the user device; and/or
    b) output of the optical, haptic and/or acoustic signal defined in the control instruction by means of the user device.

5. The method according to claim 1, wherein a sequence of process steps is stored in the central process control system, the central process control system compares the transmitted sensor data with the sequence, including with the sensor data expected according to the sequence, and the process control system generates said at least one control instruction depending on a result of the comparison of the transmitted sensor data with the sequence.

6. The method according to claim 5, wherein the first gateway and/or a location of the first gateway is linked in the central process control system to at least one part of the sequence, including at least one process step.

7. The method according to claim 1, wherein, in addition to the user device, further devices are connected to the first gateway and the control instruction is also generated using the identifier of the user device, wherein the control instruction and/or an addition record to the sensor data contain identifier of the user device.

8. The method according to claim 1, wherein said at least one control instruction is transmitted from the process control system to the user device via the first gateway.

9. A control system, comprising:
    a central process control system,
    a plurality of gateways connected to the central process control system, each of the plurality of gateways being allocated to one or more process steps,
    a wearable user device comprising a sensor and/or a screen and a communication module for wireless communication with a first gateway of the plurality of gateways, wherein the user device is configured to transmit a connection event message to the central process control system of the control system after establishing a communication link to the first gateway, wherein the connection event message contains an identifier of the user device, an identifier of the first gateway and information on a successful establishment of the communication link between the user device and the first gateway, wherein the control system is configured to execute a method including steps of:

a) establishment of the wireless communication link between the user device and the first gateway, wherein the first gateway is connected to the central process control system,
b) transmission of the connection event message to the central process control system, wherein the connection event message contains the identifier of the user device, the identifier of the first gateway and the information on the successful establishment of the communication link between the user device and the first gateway,
c) generation of sensor data by means of the sensor of the user device,
d) transmission of the sensor data from the user device to the central process control system,
e) generation of at least one control instruction by the central process control system in response to the transmitted sensor data, wherein the control instruction is generated depending on the identifier of the first gateway and depending on the transmitted sensor data, wherein in generating the control instruction depending on the identifier of the first gateway, the central process control system associates the user device with at least one process step based on the identifier of the first gateway, and
f) transmission of said at least one control instruction from the central process control system to the user device.

10. The control system according to claim 9, wherein the control system comprises a garment comprising a holder into which the user device is inserted in proper use.

11. The control system according to claim 10, wherein the garment is a glove.

12. The control system according to claim 9, wherein said at least one control instruction is transmitted from the process control system to the user device via the first gateway.

\* \* \* \* \*